United States Patent [19]
Claxton

[11] Patent Number: 5,997,013
[45] Date of Patent: Dec. 7, 1999

[54] CHASSIS STABILIZATION SYSTEM

[75] Inventor: Gerald L. Claxton, Fresno, Calif.

[73] Assignee: UpRight, Inc., Selma, Calif.

[21] Appl. No.: 08/898,897

[22] Filed: Jul. 23, 1997

[51] Int. Cl.$^6$ .................................................. B60P 1/16
[52] U.S. Cl. ............................... 280/6.154; 280/124.111; 280/124.112; 280/124.11
[58] Field of Search .................... 280/6.154, 124.111, 280/124.11, 124.112, 754; 180/41; 267/64.11, 64.12

[56] References Cited

U.S. PATENT DOCUMENTS

| | | | |
|---|---|---|---|
| 3,703,298 | 11/1972 | Laverda | 280/6.154 |
| 4,152,004 | 5/1979 | Schroder | 280/6.154 |
| 4,344,497 | 8/1982 | Rathi et al. | 280/6.154 X |
| 4,951,777 | 8/1990 | Champeau | 280/124.111 |
| 5,769,502 | 6/1998 | Bettini | 298/175 |
| 5,813,697 | 9/1998 | Bargenquast et al. | 280/754 |

*Primary Examiner*—Christopher P. Ellis
*Attorney, Agent, or Firm*—Bruce H. Johnsonbaugh

[57] ABSTRACT

A stabilizing suspension system is provided for vehicles carrying telescopic booms or aerial work platforms having a fixed axle and a oscillating axle. Hydraulic cylinders are connected to each end of the oscillating axle, each cylinder being capable of extending and retracting. An off level sensor senses the angle of tilt of the chassis in both left and right directions and, when a predetermined threshold of tilt has been detected, the hydraulic cylinder on the downhill side of the chassis is locked against retracting, but is free to move in the downhill direction to allow the downhill wheel to remain in contact with the ground.

7 Claims, 6 Drawing Sheets

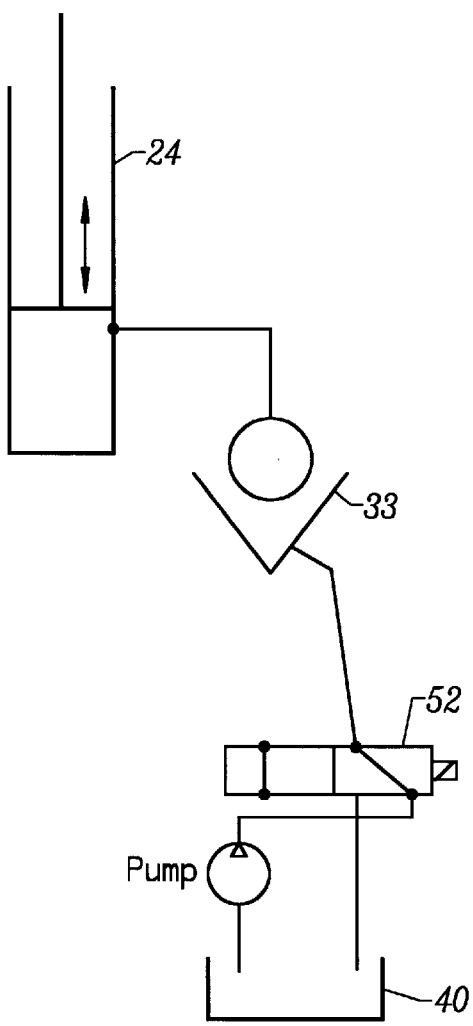
FIG. 3
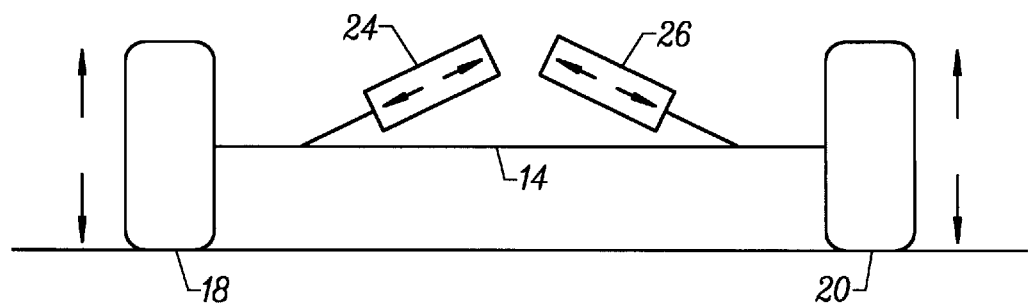

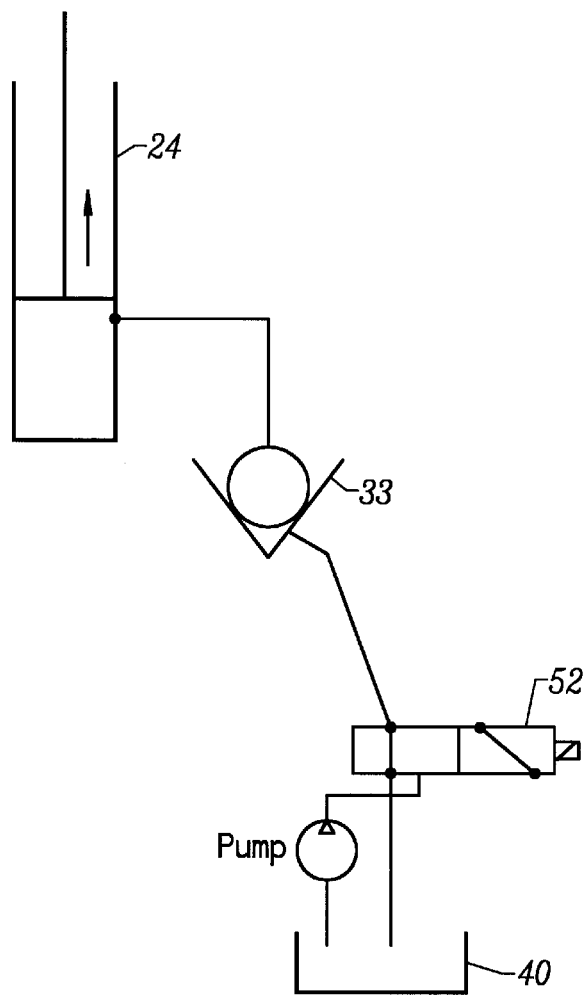
FIG. 4
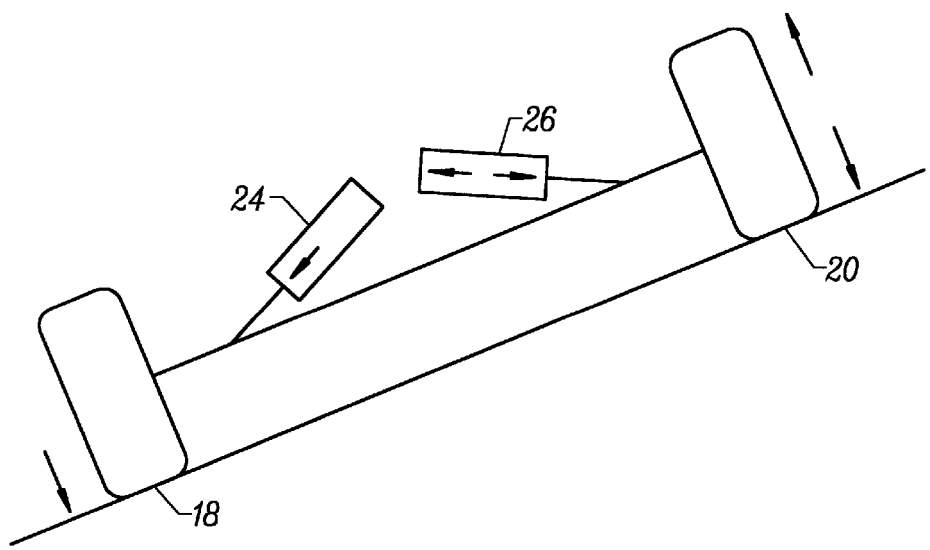

CHASSIS STABILIZATION SYSTEM

BACKGROUND OF THE INVENTION

This invention pertains generally to a stabilizing suspension system for a vehicle capable of travelling over rough terrain. More particularly, the invention pertains to a passive stabilizing suspension system for use in vehicles carrying telescopic booms or aerial work platforms. These vehicles are generally intended for elevated use only on firm level ground, otherwise the vehicle may overturn. However, in order to move the vehicle into position, it is desirable that the vehicle have the capability of travelling over rough terrain, and to be able to move on rough terrain while elevated.

The prior art includes the Barnhart U.S. Pat. No. 5,447, 331 dated Sep. 5, 1995, which teaches an active stabilization system. That patent discloses a sensor which is activated by oscillation of the rear axle. The sensor controls an active mechanism which extends a hydraulic cylinder on the front axle, thereby exerting enough force to raise one front corner of the chassis. The Barnhart patent requires that both the front and rear axle oscillate, although the rear axle has limited oscillation, but the freedom of both axles to oscillate can result in a rocking of the chassis and superstructure. The system of the Barnhart patent may, therefore, tend to bounce or rock back and forth between stops provided on the rear axle. Another disadvantage of the Barnhart patent is that it teaches an active suspension, that is the fluid is actively pumped to the hydraulic cylinder on the lower side in order to achieve sufficient force to raise the chassis. Such an active system is relatively complicated, relatively expensive to manufacture and somewhat more subject to malfunction.

The prior art also includes the Nakagawa U.S. Pat. No. 4,382,604 dated May 10, 1983. That patent teaches the use of an oscillating axle with two hydraulic cylinders disposed between the axle and the chassis. When the operator parks the vehicle and applies the brakes, the cylinders are filled with fluid to make the axle act as a fixed axle. However, a major disadvantage of Nakagawa is that the stiffening of the cylinders to resist tipping only occurs when the vehicle is parked.

SUMMARY OF THE PRESENT INVENTION

The present invention provides a system incorporating an oscillating axle in order to keep the wheels of the vehicle in consistent firm contact with the ground and which locks the oscillating axle at a predetermined amount of tilt in order to provide a resistance to overturn substantially equal to that of a fixed axle on level ground; the present invention also allows the "locked" downhill wheel to move downhill further in order to maintain contact with the ground. The "locked" wheel is prevented from retracting or moving in the direction against lean or tilt in order to maximize resistance to overturn.

The primary object of the present invention is to provide a stabilizing suspension system which allows a vehicle with a telescopic boom or aerial work platform in an elevated position to move over rough terrain.

A further object of the invention is to provide a suspension system having an oscillating axle allowing the wheels of the vehicle to remain in firm contact with the ground but which also provide a resistance to overturn substantially equal to that of a fixed axle when a predetermined threshold of tilt has been exceeded.

Another object of the invention is to provide a passive suspension system which is relatively simple and rugged in design which simultaneously allows a vehicle to negotiate rough terrain with an oscillating axle but which reliably locks the axle against motion opposite to the direction of lean or tilt of the chassis when a predetermined threshold of tilt has been exceeded.

Another object of the invention is to provide a stabilization system for a vehicle having an elevated boom or work platform which incorporates an oscillating axle to allow the wheels of the vehicle to remain in consistent firm contact with the ground but which simultaneously provides a resistance to overturn substantially equal to that of a fixed axle.

Other objects and advantages of the invention will become apparent from the following description of the preferred embodiments and the drawings wherein:

BRIEF DESCRIPTION OF THE DRAWINGS

FIG. 3 is a schematic showing the axle and chassis when they are level and showing a simplified view of a portion of the hydraulic circuit including the pilot operated check valve anti the two way valve utilized in one embodiment of the invention;

FIG. 4 is a schematic view of the axle and chassis when they are tilted beyond the predetermined threshold and showing the corresponding position of the pilot operated check valve and two way valve;

DETAILED DESCRIPTION OF THE DRAWINGS

Figure 1:
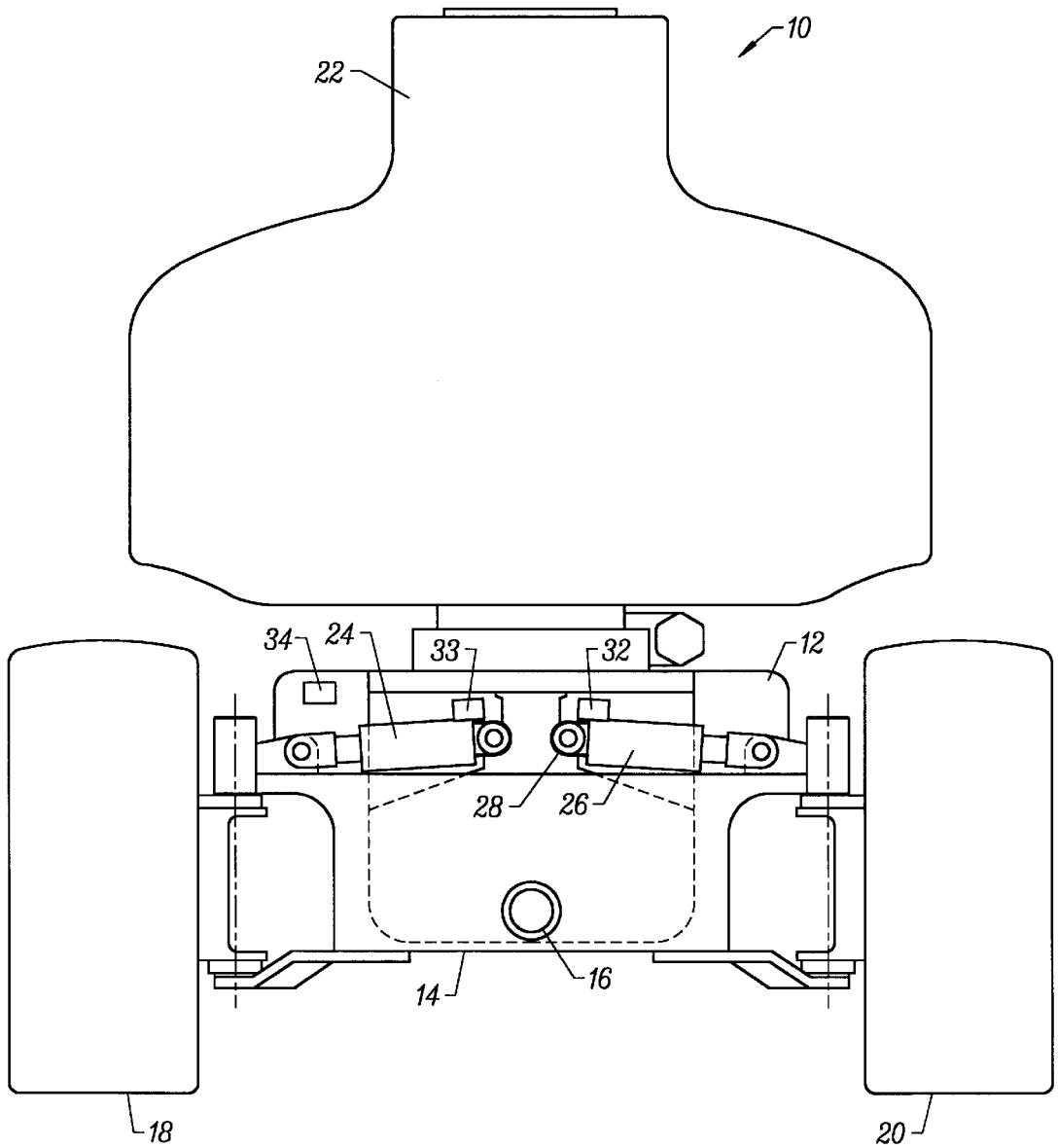
FIG. 1 is a front elevational view of one embodiment of a vehicle employing the stabilization suspension system according to the invention.

FIG. 1 depicts a work vehicle shown generally as 10 having a chassis 12 and an oscillating axle 14 pivoting around a pivot point 16. The oscillating axle 14 is preferably the front axle. The front oscillating axle is supported by front right wheel 18 and front left wheel 20. The rear wheels 72 and 74 (FIG. 7) are preferably attached directly to chassis 12. Alternatively, rear wheels 172 and 174 support a fixed axle 170 (FIG. 5) rigidly connected to the chassis 12. The fixed axle 170 is preferably the rear axle. The oscillating front axle 14 and front wheels and rear wheels (either with or without a fixed axle) combine to support the chassis 12. The chassis 12 in turn supports the body 22 of the vehicle 10.

As shown in the drawings, all four wheels are round, pneumatic tires. However, some or all of those wheels could be replaced with tracked supports. As used in the claims, the phrase "wheel means" is intended to be construed broadly to include tires as well as tracked supports and other mechanisms that provide support and traction.

A right stabilizing means 24 and a left stabilizing means 26 are provided between the chassis 12 and the oscillating axle 14. The stabilizing means 24, 26 are preferably hydraulic cylinders. Each hydraulic cylinder 24, 26 is attached to the chassis near its head end 28. The hydraulic cylinder's piston rod is attached to the axle 14. A locking means 32, 33, preferably a pilot operated check valve 32, 33, is located near the head end of each cylinder 24, 26.

Figure 2:
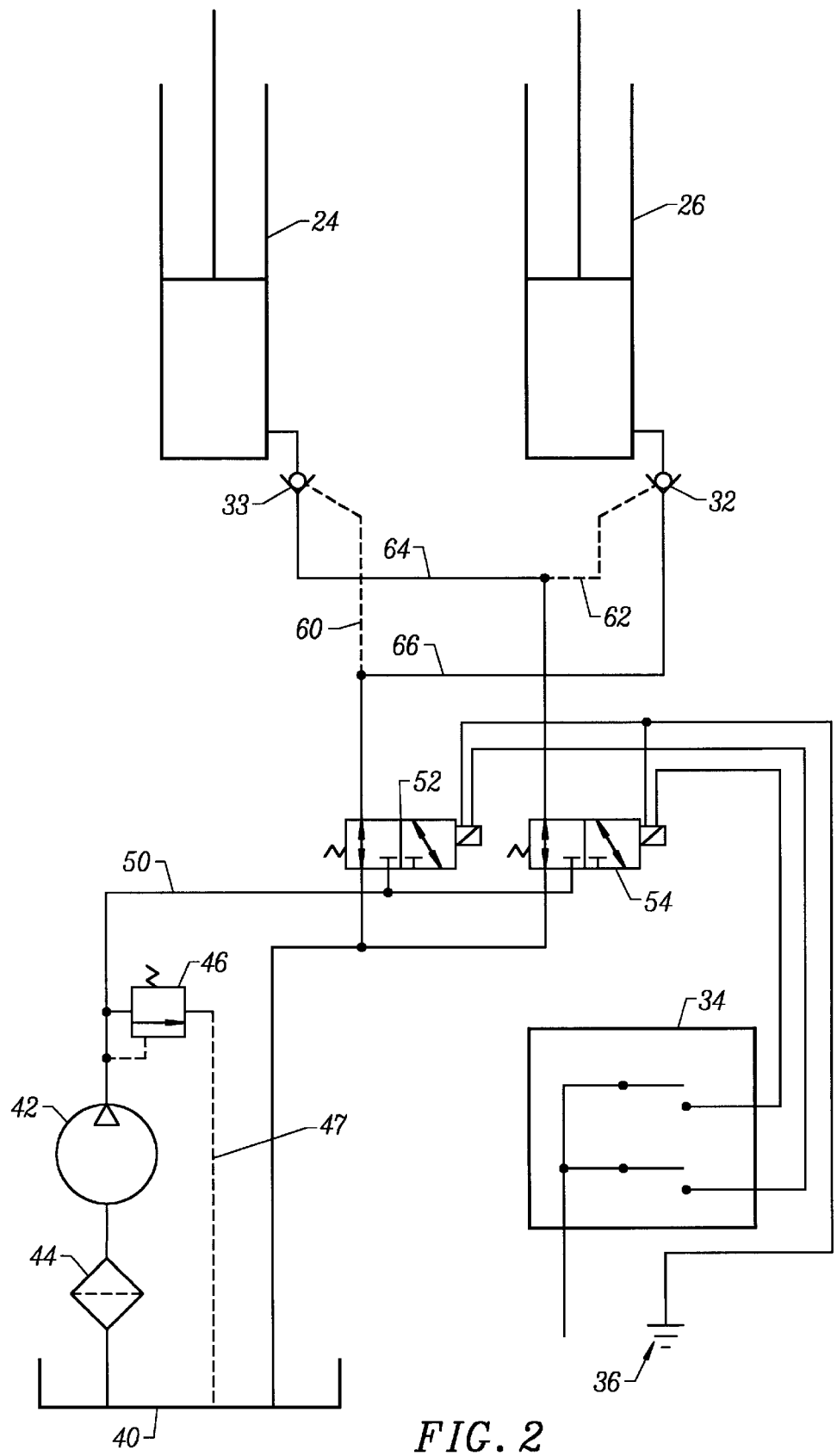
FIG. 2 is a hydraulic circuit diagram of one embodiment of the stabilizing suspension system of the invention.

A tilt sensor or off level sensing means 34 is provided on the chassis 12 near the oscillating axle 14. Referring to FIG. 2, the sensor 34 is powered by the vehicle's battery 36. A fluid reservoir 40 is provided with a hydraulic pump 42 which draws fluid from the reservoir 40 through a suction strainer 44. A relief valve 46 is provided to relieve extra pressure in the circuit by returning extra fluid to the reservoir 40 through conduit 47. The pump 42 is connected to fluid conduit 50 which channels fluid to two way solenoid valves 52, 54. The hydraulic pump 42 supplies a constant low pressure to both two way valves 52, 54. Each two way valve acts as a conduit between one of the two check valves 32, 33 and either the pump 42 or the reservoir 40, depending on the two way valve's position.

Each pilot operated check valve 32, 33 allows flow into its corresponding cylinder 24, 26 but prevents flow out of that cylinder unless the pilot line 60, 62 is pressurized in which case flow is allowed through main conduits 64, 66 in both directions. The result of the one way flow is that the cylinder 24, 26 can extend but not retract. Each of the two pilot operated check valves is connected to the other side of the two way valves 52, 54 via fluid conduits 60, 62. Each solenoid valve 52, 54 defaults to connect the pilot 60 from each check valve 32 to the reservoir 40 to eliminate any pilot pressure.

When one of the check valves 32, 33 is locked, the corresponding cylinder 24, 26 may extend in order to follow a dip in the ground but cannot be retracted unless the corresponding pilot line 60, 62 is pressurized, thus unlocking check valve 32, 33. If the wheel 18, 20 encounters a rise in the ground with its hydraulic cylinder locked, the axle 14 will behave like a rigid axle until the chassis 12 has tilted back to an angle within the setting of the tilt sensor 34. When that occurs, the tilt sensor 34 will activate the two way valve 52, 54, thus pressurizing the pilot lines 60, 62 and opening the pilot operated check valve 32, 33 and the axle 14 will once again be free to oscillate in both directions.

The electric sensor 34 is capable of sensing the angle of the chassis 12 in both the right and left tilt directions. When the tilt is beyond a predetermined threshold, the sensor has power supplied to the two way valve, shifting the valve into the default locked position.

If driving when the boom is elevated, the sensor 34 becomes active and will control the operation of the hydraulic cylinders 24, 26. When the boom is lowered while driving, an electrical signal is sent to the two way valves 52, 54 shifting them out of the default position allowing unlimited oscillation capability.

From a stability standpoint, it is ideal to allow the axle to oscillate to provide a consistent firm contact with the ground and to provide a resistance of overturn equal to that of a fixed axle. That ideal is substantially achieved by the present invention. The present invention achieves "substantially" the same resistance to overturn as a fixed axle. The term "substantially" is used herein because the oscillating axle of the present invention becomes "fixed" only when a predetermined angle (for example and without limitation 5 degrees) is exceeded. The resistance to overturn afforded by the "locked" oscillating axle 5 degrees off level is exactly equal to a fixed axle only if the fixed axle is oriented at 5 degrees off level in the same direction. In the present invention, the oscillating axle must lean a predetermined amount before it becomes "locked," whereas a fixed axle is fully supportive at any chassis tilt angle.

Figure 5:
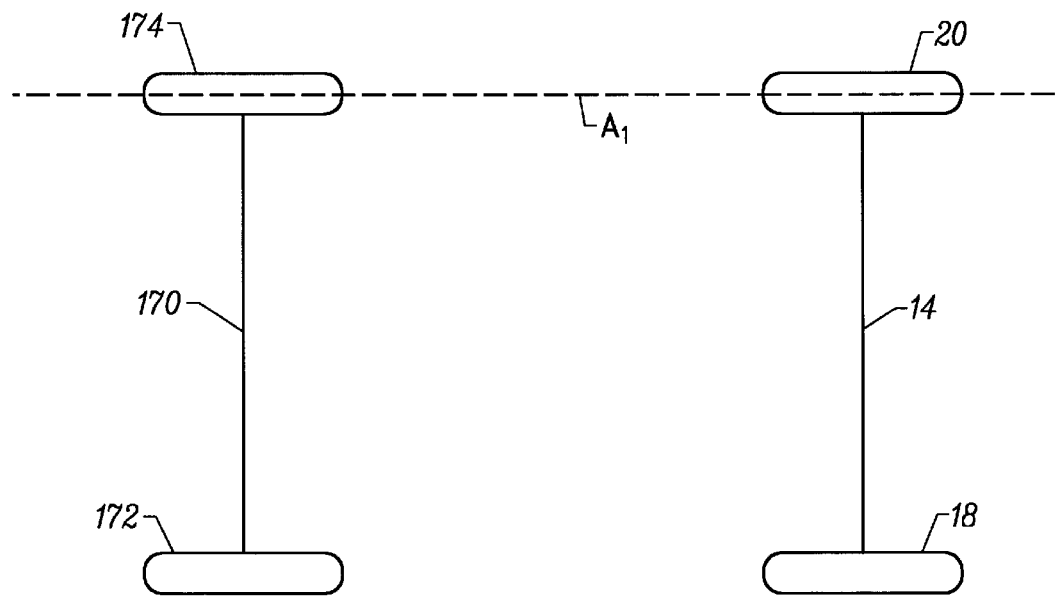
FIG. 5 is a diagram indicating the stability line of a vehicle having an oscillating axle and employing the present invention.
Figure 6:
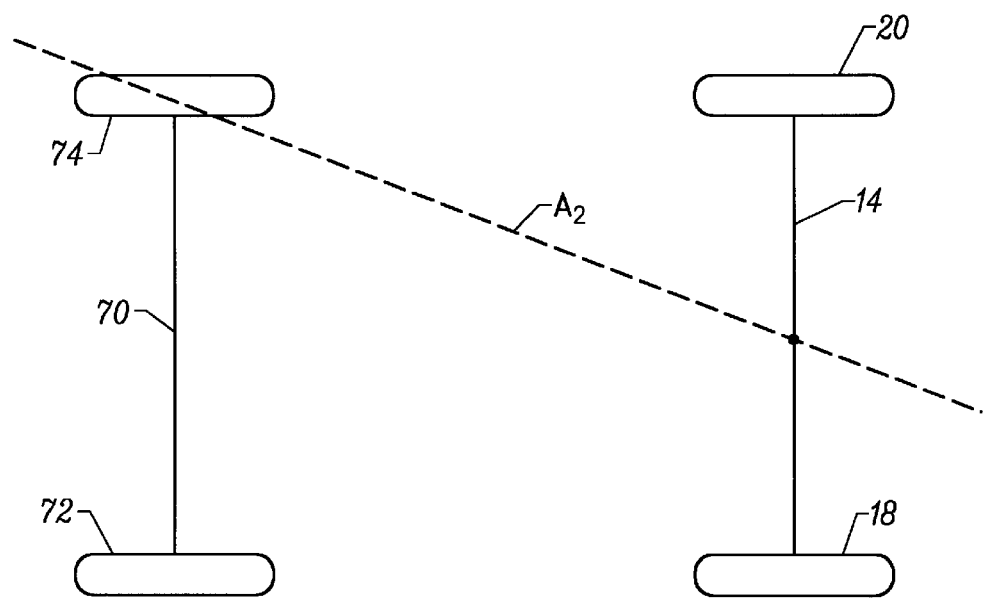
FIG. 6 is a representation of the stability line of a vehicle having a oscillating axle and not employing features; of the present invention.

An oscillating but unlocked axle moves the stability line from one drawn from wheel to wheel as shown as "$A_1$" in FIG. 5 to one drawn from back wheel to axle pivot as shown as "$A_2$" in FIG. 6. This is a substantial decrease in stability base and will render the typical machine unable to pass stability requirements when in that condition. The present invention, by "locking" the downhill cylinder against retracting, provides maximum resistance to overturn as illustrated by FIG. 5.

Figure 7:
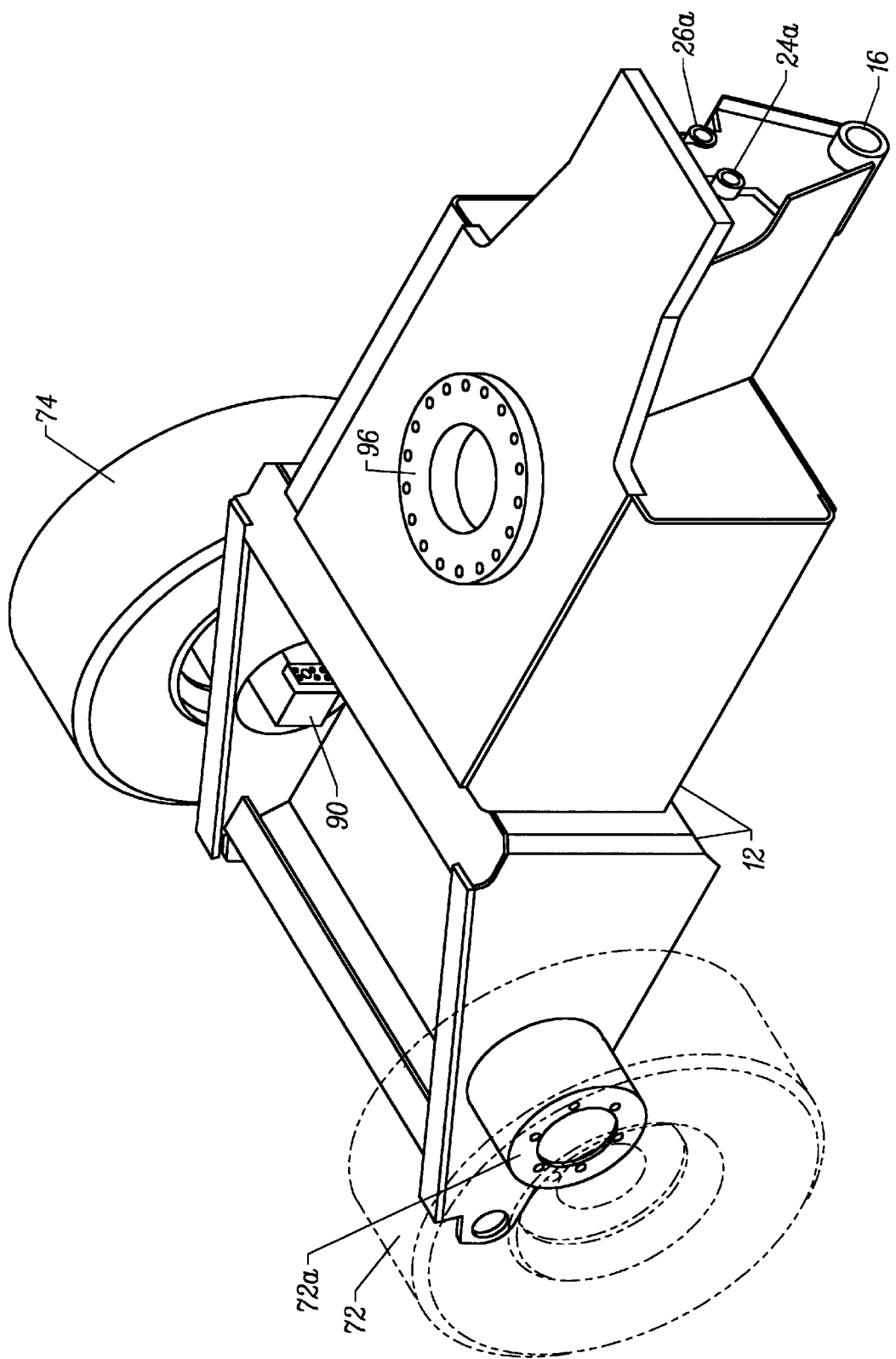
FIG. 7 is an isometric view of the vehicle of FIG. 1 showing the rear wheels attached to the chassis.

FIG. 7 shows the chassis 12 with the oscillating axle removed. The oscillating axle pivot 16 connects to the oscillating axle (not shown). The hydraulic cylinders 24 and 26 (not shown) mount to pivots 24a and 26a shown in FIG. 7 at the forward portion of chassis 12. The rear right wheel (shown in phantom) attaches to a mounting face 72a which is rigidly connected to chassis 12. Mounting face 72a is identical to the mounting face on the rear left side of the chassis (not shown in FIG. 7) which carries wheel 74. Mounting face 72a carries, in addition to the wheel, a hydraulic drive motor and brake and planetary assembly. A typical hydraulic drive motor 90 is shown mounted on the rear left portion of chassis 12 for driving wheel 74. The elevatable boom (not shown) is attached to the boom slew attachment 96 as is known in the art.

It is to be understood that the chassis stabilization system herein shown and described may be utilized in a wide variety of applications. Variations may be made in the components described herein without departing from the spirit of the invention.

What is claimed is:

1. A stabilizing suspension system which restricts an oscillating axle from movement in a direction which worsens stability, but allows the oscillating axle to move in a direction to improve stability, said system used on a vehicle capable of travelling over rough terrain having a chassis supported by two wheel means connected to an oscillating axle and two wheel means rigidly connected either directly to said chassis or to a fixed axle, the oscillating axle being pivotally connected to the chassis near the midpoint of the axle, comprising:

a left and a right hydraulic cylinder each being connected at one end to the chassis and at an opposite end to the oscillating axle, each of said hydraulic cylinders being capable of extending and retracting, an off level sensing means which senses an angle of the chassis in both left and right tilt directions, locking means which, when locked, prevents one of said hydraulic cylinders from retracting while still allowing said hydraulic cylinder to extend, and control means which locks the locking means for said hydraulic cylinder on the downhill side of the chassis when the vehicle is on uneven terrain and the sensing means indicates the downhill side of the chassis is tilted beyond a predetermined threshold, thereby allowing said downhill cylinder to extend to improve the stability of the chassis and to keep the downhill wheel in contact with the ground, but preventing said downhill cylinder from retracting.

2. The stabilizing suspension system of claim 1 wherein the locking means comprises a pilot operated check valve in fluid communication with a pilot line, the check valve allowing flow into the hydraulic cylinder while preventing flow out of the hydraulic cylinder unless the pilot line is pressurized thereby allowing flow both into and out of the hydraulic cylinder.

3. The stabilizing suspension system of claim 2 further comprising a pump and a reservoir.

4. The stabilizing suspension system of claim 3 wherein the control means comprises a two way valve.

5. The stabilizing suspension system of claim 4 in which indication from the sensing means that the tilt direction is beyond the predetermined threshold moves the two way valve to the default position thereby preventing flow out of the hydraulic cylinder and preventing the cylinder from retracting.

6. The stabilizing suspension system of claim 5 in which indication from the sensing means that the tilt direction is less than the predetermined threshold moves the two way valve out of the default position thereby allowing flow out of the hydraulic cylinder and allowing the cylinder to either extend or retract.

7. The stabilizing suspension system of claim 6 in which the sensing means is mounted on the chassis.

* * * * *